(12) United States Patent
Nguyen et al.

(10) Patent No.: US 6,839,698 B2
(45) Date of Patent: Jan. 4, 2005

(54) FUZZY GENETIC LEARNING AUTOMATA CLASSIFIER

(75) Inventors: Duong Nguyen, Denver, CO (US); Scott A. Imhoff, Highlands Ranch, CO (US); Susan R. Kent, Centennial, CO (US)

(73) Assignee: Northrop Grumman Corporation, Los Angeles, CA (US)

( * ) Notice: Subject to any disclaimer, the term of this patent is extended or adjusted under 35 U.S.C. 154(b) by 531 days.

(21) Appl. No.: 09/925,866

(22) Filed: Aug. 9, 2001

(65) Prior Publication Data

US 2003/0074336 A1 Apr. 17, 2003

(51) Int. Cl.[7] .............................................. G06N 5/02
(52) U.S. Cl. .......................................... 706/13; 706/2
(58) Field of Search ...................... 706/13, 2; 382/305; 707/5

(56) References Cited

U.S. PATENT DOCUMENTS

| 5,481,269 | A |   | 1/1996 | Imhoff et al. |         |
|-----------|---|---|--------|---------------|---------|
| 5,606,690 | A | * | 2/1997 | Hunter et al. | 707/5   |
| 5,943,659 | A | * | 8/1999 | Giles et al.  | 706/2   |
| 6,400,853 | B1| * | 6/2002 | Shiiyama      | 382/305 |

OTHER PUBLICATIONS

Wee, William Go, "On Generalizations of Adaptive Algorithms and Application of the Fuzzy Sets Concept to Pattern Classification," Thesis submitted to Purdue University, Aug. 1967.

* cited by examiner

*Primary Examiner*—Wilbert L. Starks, Jr.
(74) *Attorney, Agent, or Firm*—Tarolli, Sundheim, Covell & Tummino L.L.P.

(57) ABSTRACT

A method is provided for deriving a near-optimal fuzzy automaton for a given separation problem. The method includes the steps of: forming a first generation population (24) of fuzzy automata, where the first generation population of fuzzy automata includes a plurality of fuzzy automata; performing a mutation operation (28) on each fuzzy automaton in the first generation population of fuzzy automata; reproducing the first generation population of fuzzy automata using a survival of the fittest operation (30, 32, 34); and applying a cross-over operator (36) to the reproduced first generation population of fuzzy automata, thereby yielding a next-generation population of fuzzy automata. A near-optimal fuzzy automaton is identified by evaluating the performance (38) of each fuzzy automaton in the next-generation population; otherwise the methodology is repeated until a near-optimal fuzzy automaton is derived for the given separation problem.

23 Claims, 5 Drawing Sheets

FUZZY GENETIC LEARNING AUTOMATA CLASSIFIER

GOVERNMENT RIGHTS

The U.S. Government has certain rights in this invention pursuant to the clause at FAR 52.227-12.

BACKGROUND OF THE INVENTION

1. Field of the Invention

This invention relates generally to signal classifiers, and, more particularly, to a signal classifier which employs fuzzy genetic learning automata.

2. Discussion of the Related Art

Typical passive sensor systems which collect wideband signals are receiving an enormous flux of information from a continually evolving signal environment. This enormous flux of information threatens to exceed the capacities of the human signal analysts to analyze the data. As a result, there is a pressing need for artificially intelligent systems which quickly analyze the arriving data stream, and, while so doing, effect machine learning in order to adapt to the continual signal-environmental changes. The intelligent systems should filter the signal data by identifying and separating known signals from the arriving flux of signal information. This potentially reduces the workload for the human signal analyst by allowing him/her to focus attention on signal features which are more likely to contain mission-important information.

Adaptive front-end signal classifiers are generally known in the art. Conventional front-end signal classifiers utilize many inner product-based schemes which compare the arriving signal to a set of basis functions that serve as exemplary signals. These inner product-based schemes may be based on Fourier analysis, wavelets, and/or Gabor transforms. In each of these schemes, the computational intensity is high and there is little flexibility to adapt to a changing signal environment.

Therefore, it is desirable to provide an adaptive signal classifier which learns to identify specific embedded spatiotemporal signals in an arriving signal data stream of an evolving signal environment. More specifically, it is desirable to implement a signal classifier using fuzzy automata. Fuzzy automata generally use min-max aggregation to process the incoming data, thereby obviating the need for highly intense inner product-based comparisons to exemplary signals. Since each fuzzy automata is a language-learning system, only one requirement needs to be imposed on the signals that are to be acquired: a signal needs to be characterizable as occurring in one or more states and transitioning as a whole or partially among some or all states over time. Thus, the formal language framework of fuzzy automata is particularly well-matched to signal separation applications. In addition, the operation of each fuzzy automaton is independent of the durations of the incoming signals.

SUMMARY OF THE INVENTION

In accordance with the teachings of the present invention, a method is provided for deriving a near-optimal fuzzy automaton for a given separation problem. The method includes the steps of: (a) forming a first generation population of fuzzy automata, where the first generation population of fuzzy automata includes a plurality of fuzzy automata; (b) performing a mutation operation on each fuzzy automaton in the first generation population of fuzzy automata; (c) reproducing the first generation population of fuzzy automata using a survival of the fittest operation; and (d) applying a cross-over operator to the reproduced first generation population of fuzzy automata, thereby yielding a next-generation population of fuzzy automata. A near-optimal fuzzy automaton is identified by evaluating the performance of each fuzzy automaton in the population; otherwise the methodology is repeated until a near-optimal fuzzy automaton is derived for the given separation problem.

Additional objects, features and advantages of the present invention will become apparent from the following description and appended claims taken in conjunction with the accompanying drawings.

DETAILED DESCRIPTION OF THE PREFERRED EMBODIMENTS

Figure 1:
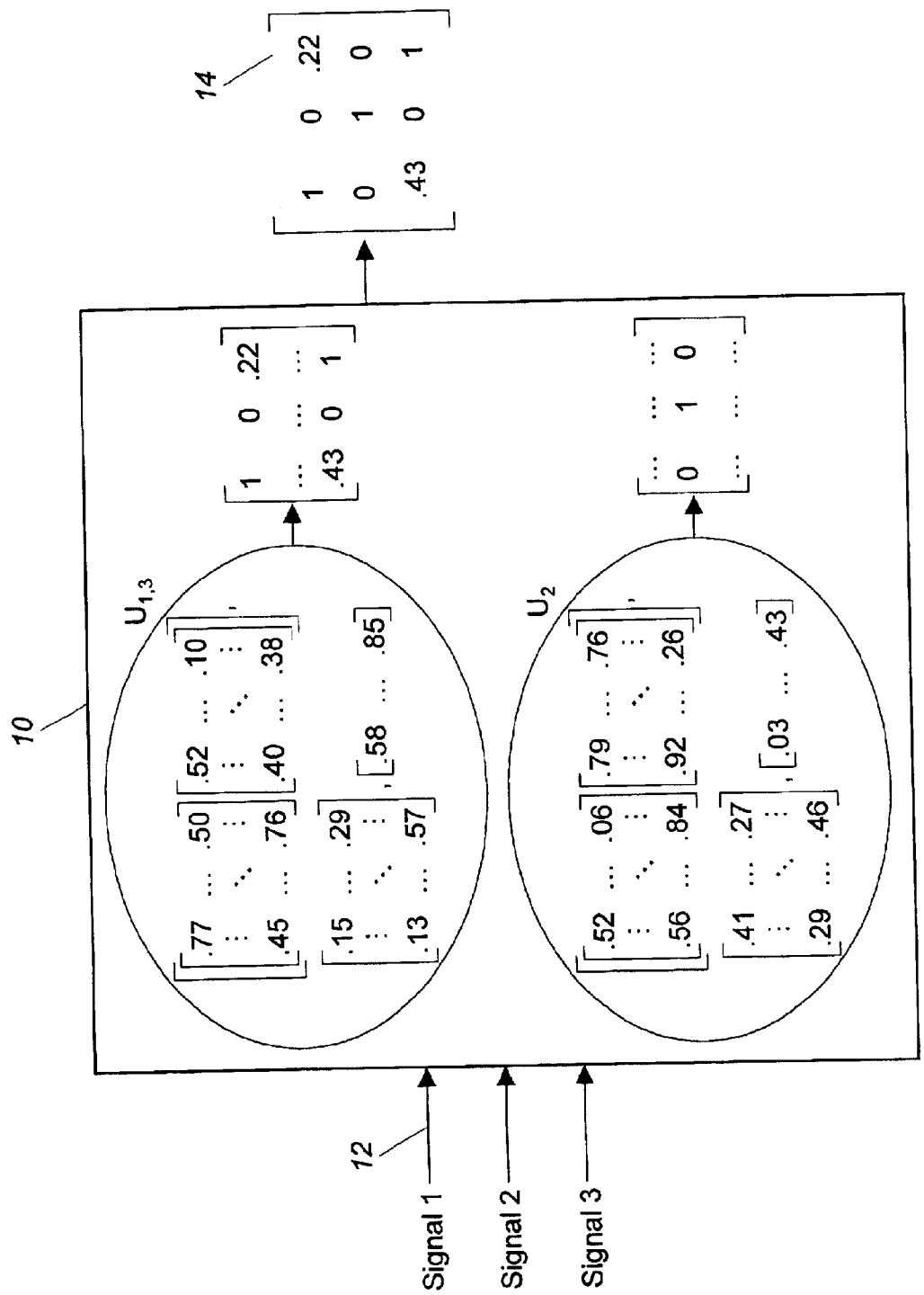
FIG. 1 is a diagram depicting an exemplary signal classifier implemented in accordance with the present invention.

FIG. 1 illustrates an exemplary signal classifier 10 that is implemented using fuzzy genetic learning automata in accordance with the present invention. Each of the fuzzy genetic learning automata are dedicated to learning and separating a specific signal or a particular set of signals from an evolving signal environment. As will be apparent to one skilled in the art, two or more fuzzy automata may be used to implement the signal classifier 10. In a preferred embodiment, each of the fuzzy automata are implemented as individual software agents.

In operation, the signal classifier 10 receives a plurality of input signals 12 from a signal environment. The input signals 12 are evaluated by each of the fuzzy automata. For illustration purposes, a first automaton, $U_{1,3}$, is intended to classify Signals 1 and 3 and distinguish them from Signal 2; whereas a second automaton, $U_2$, is intended to classify Signal 2 and distinguish it from Signals 1 and 3. Each fuzzy automaton outputs a confusion matrix, where the rows of the matrix are output vectors arranged according to the input signals. For instance, when Signal 1 is presented to the first automaton, $A_{1,3}$, the first row of the confusion matrix is ideally [1 0 0]. Similarly, when Signal 3 is presented to the first automaton, $A_{1,3}$, the third row of the confusion matrix is ideally [0 0 1]. Likewise, when Signal 2 is presented to the second automaton, $A_2$, the second row of the confusion matrix is ideally [0 1 0]. Thus, the resulting output from the signal classifier 10 is an aggregate confusion matrix 14 having the appropriate rows from each of the individual automata. In this example, the first and third rows of the aggregate confusion matrix correspond to the first and third rows of the confusion matrix from the first automaton, and the second row of the aggregate confusion matrix corresponds to the second row of the confusion matrix from the second automaton. It is noteworthy that the aggregate performance of a signal classifier built from two or more fuzzy automata is typically better than the performance of each individual fuzzy automaton.

Figure 2A:
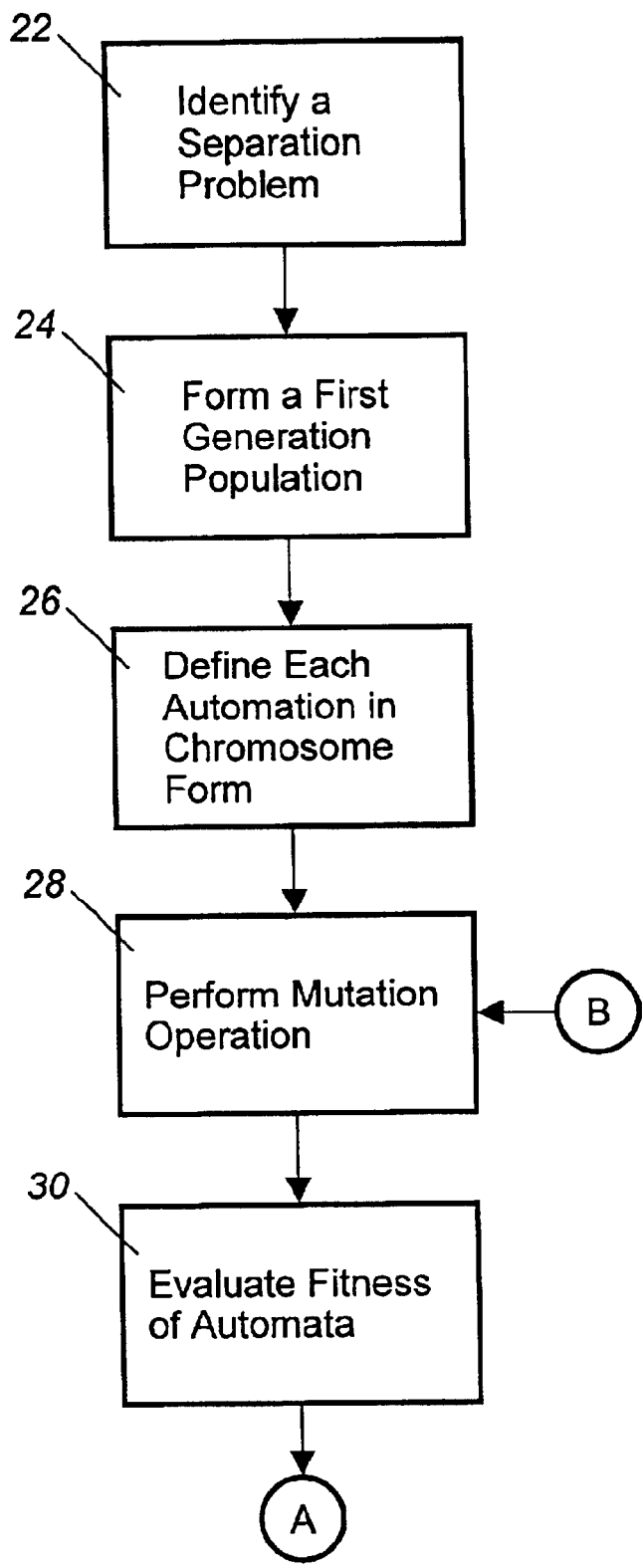
FIGS. 2A and 2B are flowcharts illustrating a method for deriving near-optimal fuzzy automata for a given separation problem in accordance with the present invention.
Figure 2B:
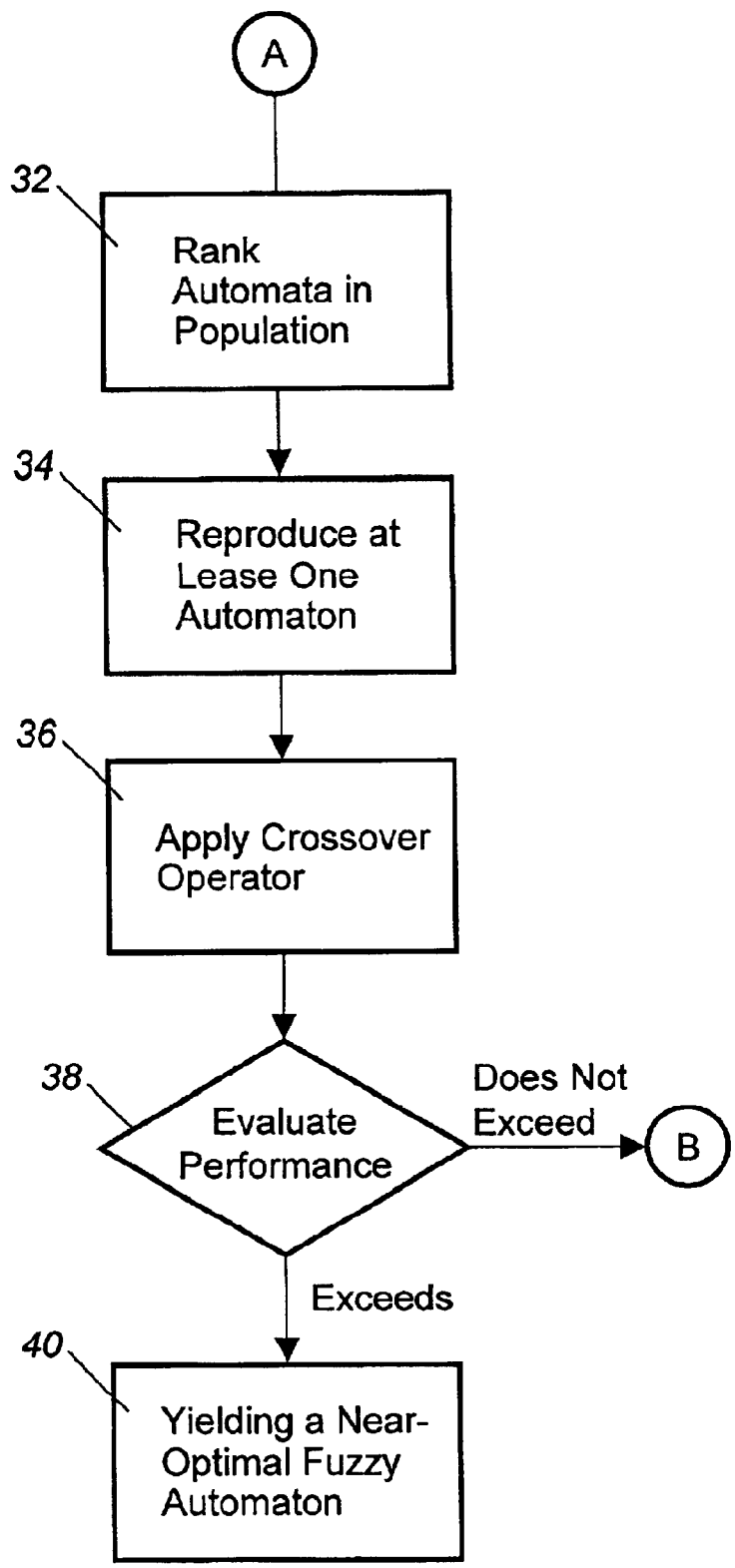

A method for deriving a near-optimal fuzzy automaton for a given separation problem is shown in FIGS. 2A and 2B. In accordance with the present invention, the near-optimal fuzzy automata may then serve as the basis for a signal classifier. First, a separation problem must be identified 22 from the signal environment. A separation problem, $\Sigma$, is a set of signals {Signal 0, Signal 1, . . . , Signal $\xi$} that need to be separated from each other. Each of the signals is further defined as a vector labeled with time, such as $A_t=[a^t{}_0, a^t{}_1, \ldots, a^t{}_{m-1}]$, $t=0, 1, \ldots, {}_{102}$. Near-optimal fuzzy automata can then be derived for the given separation problem. A fuzzy automaton is a well known type of mathematical object as described by George J. Klir and Bo Yuam in the text *Fuzzy Sets and Fuzzy Logic, Theory and Applications*, Prentice Hall, 1995. A fuzzy automaton, U, may be represented by a quintuple $U=({}_US, {}_UR, {}_UE^0, A^*, B^*)$, where ${}_US$ is an l×l×m matrix of fuzzy state transitions for fuzzy automaton U; ${}_UR$ is an l×p matrix of fuzzy output transitions for fuzzy automaton U; ${}_UE^0$ is an initial vector of fuzzy state memberships of length l; A* is a space of input vectors, each vector having length m; and B* is a space of output vectors, each of length p.

Initially, an input set of fuzzy automata is chosen stochastically by pulling elements of S, R, and $E^0$ at random from the unit interval until a set of fuzzy automata with some positive separability is realized. A population of fuzzy automata, $\{{}^gU^0, {}^gU^1, \ldots, {}^gU^{\pi-1}\}$, is then formed 24 by randomly selecting a subset from the input set of fuzzy automata. In this notation, a fuzzy automaton, U, belongs to a certain generation as designated by a pre-superscript, g, where g is a non-negative integer. Likewise, a post-superscript is used to designate a particular member of the population. Thus, a first generation population of fuzzy automata is represented as $\{{}^1U^0, {}^1U^1, \ldots, {}^1U^{\pi-1}\}$.

A genetic algorithm is iteratively applied to the population of fuzzy automata until a near-optimal fuzzy automaton is derived for the given separation problem. In general, a genetic algorithm is a model of learning which derives its behavior from a metaphor of the processes of evolution as they occur in nature. In nature, the members of a population are derived from and represented by chromosomes. Likewise, the members of a population of fuzzy automata must be represented in a chromosome paradigm in order to apply a genetic algorithm.

In accordance with the present invention, at least the first three elements of the quintuple U, which are ${}_US$, ${}_UR$, ${}_UE^0$, are redefined 26 in chromosome form. In particular, each data value of each matrix which comprises an element of the fuzzy automaton is represented as a binary word. For example, ${}_US$ is defined as follows:

$${}_US = \begin{bmatrix} \begin{bmatrix} {}_Us_{0,0,0} & {}_Us_{0,1,0} & \cdots & {}_Us_{0,l-1,0} \\ {}_Us_{1,0,0} & {}_Us_{1,1,0} & \cdots & {}_Us_{1,l-1,0} \\ \vdots & \vdots & & \vdots \\ {}_Us_{l-1,0,0} & {}_Us_{l-1,1,0} & \cdots & {}_Us_{l-1,l-1,0} \end{bmatrix} \\ \begin{bmatrix} {}_Us_{0,0,1} & {}_Us_{0,1,1} & \cdots & {}_Us_{0,l-1,1} \\ {}_Us_{1,0,1} & {}_Us_{1,1,1} & \cdots & {}_Us_{1,l-1,1} \\ \vdots & \vdots & & \vdots \\ {}_Us_{l-1,0,1} & {}_Us_{l-1,1,1} & \cdots & {}_Us_{l-1,l-1,1} \end{bmatrix} \cdots \end{bmatrix}$$

-continued
$$\begin{bmatrix} {}_Us_{0,0,m-1} & {}_Us_{0,1,m-1} & \cdots & {}_Us_{0,l-1,m-1} \\ {}_Us_{1,0,m-1} & {}_Us_{1,1,m-1} & \cdots & {}_Us_{1,l-1,m-1} \\ \vdots & \vdots & & \vdots \\ {}_Us_{l-1,0,m-1} & {}_Us_{l-1,1,m-1} & \cdots & {}_Us_{l-1,l-1,m-1} \end{bmatrix}$$

where each data value is ${}_Us_{h,i,j} = ({}_Us_{h,i,j})_0 \circ ({}_Us_{h,i,j})_1 \circ \cdots \circ ({}_Us_{h,i,j})_{n-1}$ such that each term $({}_Us_{h,i,j})_k$ in the concatenation is an element of $\{0, 1\}$ and $\circ$ is the concatenation operator. Accordingly, each data value, ${}_Us_{h,i,j}$, of the matrix is a chromosome, e.g., 00101 . . . 0011, of some length n. As will be apparent to one skilled in the art, ${}_UR$ and ${}_UE^0$ can be similarly redefined in chromosome form.

A mutation operation can then be applied 28 to each of the fuzzy automata in the population. To effect mutation, a small number of data entries in S, R, and $E^0$ for each automaton are randomly selected. For each entry, a random location along the bit string is flipped from 0→1 or 1→0. The bit flip function, $\mathfrak{I}$, on the set $\{0, 1\}$ may be defined as $\mathfrak{I}(b)=(b+1)(modulo 2)$, where b is a member of $\{0,1\}$. In a preferred embodiment, mutation only occurs in the semi-automaton $\{{}_US, {}_UR, {}_UE^0\}$.

For illustration purposes, consider a 2×4×3 fuzzy automaton where the random entries chosen for mutation are marked with a star as follows:

$$\left\{ \begin{bmatrix} \begin{bmatrix} \cdot & \cdot & \cdot & \cdot \\ \cdot & * & \cdot & \cdot \\ \cdot & \cdot & \cdot & \cdot \end{bmatrix} \begin{bmatrix} \cdot & \cdot & \cdot & \cdot \\ \cdot & \cdot & \cdot & \cdot \\ \cdot & \cdot & \cdot & \cdot \end{bmatrix} \begin{bmatrix} \cdot & \cdot & * \\ \cdot & \cdot & \cdot \\ \cdot & \cdot & \cdot \end{bmatrix} \end{bmatrix}, [\cdot \ \cdot \ \cdot \ \cdot] \right\}$$

Thus, there are two data entries where mutation by bit flipping occurs: ${}_Us_{1,1,0}$ and ${}_Ur_{0,2}$. Within each data entry, a random location is then selected. For example, suppose that the third bit is flipped for ${}_Us_{1,1,0}$ and the fifth bit is flipped for ${}_Ur_{0,2}$. The resulting mutation operation would be as follows:

$$({}_Us_{1,1,0})_0 \circ ({}_Us_{1,1,0})_1 \circ ({}_Us_{1,1,0})_2 \circ \cdots \circ ({}_Us_{1,1,0})_7 \Rightarrow$$
$$({}_Us_{1,1,0})_0 \circ ({}_Us_{1,1,0})_1 \circ \mathfrak{I}(({}_Us_{1,1,0})_2) \circ \cdots \circ ({}_Us_{1,1,0})_7$$

and $$(r_{0,2})_0 \circ ({}_Ur_{0,2})_1 \circ ({}_Ur_{0,2})_2 \circ \cdots \circ ({}_Ur_{0,2})_7 \Rightarrow$$
$$({}_Ur_{0,2})_0 \circ ({}_Ur_{0,2})_1 \circ \cdots \circ \mathfrak{I}(({}_Ur_{0,2})_5) \circ ({}_Ur_{0,2})_6 \circ ({}_Ur_{0,2})_7.$$

One skilled in the art will readily recognize that the above description is merely exemplary of a mutation operation. It is envisioned that other rules may be devised for effecting a mutation operation within the scope of the present invention.

Next, the first generation population of fuzzy automata is reproduced in accordance with a survival of the fittest operation. As will be more fully explained below, reproduction involves the following three steps: (1) evaluating the fitness 30 of each fuzzy automata in the population, (2) ranking the fuzzy automata 32 within the population according to the fitness of each fuzzy automata, and (3) reproducing at least one of the fuzzy automata 34 in accordance with some reproduction rule.

First, each of the fuzzy automata are evaluated for fitness via a fitness function. In a preferred embodiment of the present invention, the fitness of each fuzzy automaton is assessed using a diagonal dominance indicator. While the following description is provided with reference to a particular fitness function, it is envisioned that other known fitness functions fall within the broader aspects of the present invention.

In order to determine a diagonal dominance indicator for a fuzzy automaton, a set of input signals must be identified from the signal environment. The set of input signal are evaluated by each fuzzy automaton in the population, thereby yielding a confusion matrix for each fuzzy automaton. A diagonal dominance indicator is computed for each confusion matrix, where a figure of merit for diagonal dominance, D, is provided as follows:

$$D = (C_{smallest\ on\text{-}diagonal} - C_{largest\ off\text{-}diagonal}) / ((C_{smallest\ on\text{-}diagonal} + C_{largest\ off\text{-}diagonal})/2).$$

For illustration purposes, the diagonal dominance indicator for an exemplary confusion matrix of $$({}^gU^0, {}^gU^1, {}^gU^2, {}^gU^3, {}^gU^4, {}^gU^5, {}^gU^6, {}^gU^7) \Rightarrow$$
$$\{{}^gU^0, {}^gU^0, {}^gU^1, {}^gU^1, {}^gU^2, {}^gU^3, {}^gU^4, {}^gU^5\}$$

is computed as $D = (1.17 - 0.36)/((1.17 + 0.36)/2) = 1.06$. As will be apparent to one skilled in the art, a diagonal dominance indicator for a confusion matrix may be computed in accordance with other known figures of merit.

Second, each of the fuzzy automata in the population are ranked according to the fitness of the individual automaton, where the diagonal dominance indicator is indicative of the fitness of an automaton. More specifically, the fuzzy automata are ranked from the fuzzy automata having the largest diagonal dominance to the fuzzy automata having the smallest diagonal dominance.

Third, at least one of the fuzzy automata in the population is reproduced in accordance with a reproduction rule. In accordance with a survival of the fittest approach, the reproduction rule is fashioned such that the highest ranking fuzzy automata are reproduced and the poorest ranking automata are eliminated. For example, given a population of eight fuzzy automata, an exemplary reproduction rule may specify that the two highest ranking automata are duplicated, the four middle ranking automata are maintained, and the lowest two ranking automata are eliminated. This exemplary reproduction rule is illustrated as follows:

$$\begin{bmatrix} 1.17 & .21 & .23 \\ .00 & 1.24 & .36 \\ .10 & .22 & 1.26 \end{bmatrix}$$

This particular reproduction rule has the advantage of maintaining a constant population size of eight. It is envisioned that other types of reproduction rules fall within the scope of the present invention.

Once the population of fuzzy automata is reproduced in accordance with a survival of the fittest operation, a unique crossover operator may be applied 36 to the population of fuzzy automata. In general, fuzzy automata crossover operates on two fuzzy automata, U and V, from a particular generation of automata, and produces two new fuzzy automata, W and X, belonging to a next generation of the population. More specifically, the crossover operator is specified as a transform $\Xi_\Psi$ which maps the tuple of input automata (U, V), to the tuple of output, next-generation automata (W, X). In other words, the crossover operator may be expressed as $$\Xi_\Psi((U, V)) = (W, X)$$

As will be described below, only the state transitions $_*S$, the response transitions $_*R$, and the initial states $_*E$ are involved in the crossover operation. The spaces A* and B* are not involved in the crossover operation.

In the transform $\Xi_\Psi$, the label $\Psi$ is an ordered triple $\Psi = (\Psi_S, \Psi_R, \Psi_{E0})$, where $\Psi_S, \Psi_R, \Psi_{E0}$ are matrices having the same dimensions as $_*S$, $_*R$, and $_*E^0$. The entries in the arrays are numbers from the set $\{1, 2, \ldots, n-1\}$, such that the entries determine the alleles of the crossover. In other words, the entries determine the points along the chromosomes where crossover is to occur. These matrices are expressed as follows:

$$\Psi_S = \begin{bmatrix} \begin{bmatrix} k_{S;0,0,0} & k_{S;0,1,0} & \cdots & k_{S;0,l-1,0} \\ k_{S;1,0,0} & k_{S;1,1,0} & \cdots & k_{S;1,l-1,0} \\ \vdots & \vdots & & \vdots \\ k_{S;l-1,0,0} & k_{S;l-1,1,0} & \cdots & k_{S;l-1,l-1,0} \end{bmatrix} \\ \begin{bmatrix} k_{S;0,0,1} & k_{S;0,1,1} & \cdots & k_{S;0,l-1,1} \\ k_{S;1,0,1} & k_{S;1,1,1} & \cdots & k_{S;1,l-1,1} \\ \vdots & \vdots & & \vdots \\ k_{S;l-1,0,1} & k_{S;l-1,1,1} & \cdots & k_{S;l-1,l-1,1} \end{bmatrix} \cdots \\ \begin{bmatrix} k_{S;0,0,m-1} & k_{S;0,1,m-1} & \cdots & k_{S;0,l-1,m-1} \\ k_{S;1,0,m-1} & k_{S;1,1,m-1} & \cdots & k_{S;1,l-1,m-1} \\ \vdots & \vdots & & \vdots \\ k_{S;l-1,0,m-1} & k_{S;l-1,1,m-1} & \cdots & k_{S;l-1,l-1,m-1} \end{bmatrix} \end{bmatrix}$$

$$\Psi_R = \begin{bmatrix} k_{R;0,0} & k_{R;0,1} & \cdots & k_{R;0,p-1} \\ k_{R;1,0} & k_{R;1,1} & \cdots & k_{R;1,p-1} \\ \vdots & \vdots & & \vdots \\ k_{R;l-1,0} & k_{R;l-1,1} & \cdots & k_{R;l-1,p-1} \end{bmatrix}$$

$$\Psi_{E0} = [k_{E0;0} \quad k_{E0;1} \quad \cdots \quad k_{E0;l-1}]$$

The operation of the transform $\Xi_{105}$ can be further specified in view of this definition for $\Psi$. In particular, each element of the fuzzy automata W and X are further expressed in terms of the elements of U and V. For instance, the first element of W, $_WS$, is generated as follows:

$$_W s_{h,i,j} = (_U s_{h,i,j})_0 \circ (_U s_{h,i,j})_1 \circ \cdots \circ (_U s_{h,i,j})_{k_{S;h,i,j}-1} \circ (_V s_{h,i,j})_{k_{S;h,i,j}} \circ \cdots \circ (_V s_{h,i,j})_{n-1}$$

for each data value $_WS_{h,i,j}$ within $_WS$. In other words, $_WS_{h,i,j}$ obtains its front portion from $_US_{h,i,j}$ and its tail portion from $_VS_{h,i,j}$. It is noteworthy that $k_{S;h,i,j}$ from $\Psi_S$ is used to identify the crossover point within the binary word that represents each data value.

The second element of W, $_WR$, is generated similarly as follows:

$$_W r_{h,i,j} = (_U r_{h,i,j})_0 \circ (_U r_{h,i,j})_1 \circ \cdots \circ (_U r_{h,i,j})_{k_{R;h,i,j}-1} \circ (_V r_{h,i,j})_{k_{R;h,i,j}} \circ \cdots \circ (_V r_{h,i,j})_{n-1}$$

for each data value $_Wr_{h,i,j}$ within $_WR$. Likewise, the third element of W, $_WE^0$, is generated as follows:

$$_W e_{h,i,j}^0 = (_U e_{h,i,j}^0)_0 \circ (_U e_{h,i,j}^0)_1 \circ \cdots \circ (_U e_{h,i,j}^0)_{k_E^0;h,i,j-1} \circ (_V e_{h,i,j}^0)_{k_E^0;h,i,j} \circ \cdots \circ (_V e_{h,i,j}^0)_{n-1}$$

The next generation fuzzy automaton, X, is generated in a similar manner. However, in this instance, the front portion of the chromosome comes from V and the tail portion of the chromosome comes from U. Each element of X is further expressed below. The first element of X, $_xS$, is generated as follows:

$$_xS_{h,i,j} = (_VS_{h,i,j})_0 {}^{\circ} (_VS_{h,i,j})_1 {}^{\circ} \ldots {}^{\circ} (_VS_{h,i,j})_{k_S;h,i,j-1} {}^{\circ} (_US_{h,i,j})_{k_S;h,i,j} {}^{\circ} \ldots {}^{\circ} (_US_{h,i,j})_{n-1}$$

for each data value within $_xS$. The second element of X, $_xR$, is generated as follows:

$$_xr_{h,i,j} = (_Vr_{h,i,j})_0 {}^{\circ} (_Vr_{h,i,j})_1 {}^{\circ} \ldots {}^{\circ} (_Vr_{h,i,j})_{k_R;h,i,j-1} {}^{\circ} (_Ur_{h,i,j})_{k_R;h,i,j} {}^{\circ} \ldots {}^{\circ} (_Ur_{h,i,j})_{n-1}$$

for each data value $_xR$. The third element of X, $_xE^0$, is generated as follows:

$$_xe_{h,i,j}{}^0 = (_Ve_{h,i,j}{}^0)_0 {}^{\circ} (_Ve_{h,i,j}{}^0)_1 {}^{\circ} \ldots {}^{\circ} (_Ve_{h,i,j}{}^0)_{k_E{}^0;h,i,j-1} {}^{\circ} (_Ue_{h,i,j}{}^0)_{k_E{}^0;h,i,j} {}^{\circ} \ldots {}^{\circ} (_Ue_{h,i,j}{}^0)_{n-1}$$

for each data value of $_xE^0$. Thus, the crossover transform has been described in complete detail.

For illustration purposes, an exemplary crossover operation is illustrated below. Suppose U and V are as follows:

$$_US = \left[ \begin{bmatrix} 0011000000 & 0000100111 \\ 0011011111 & 0011000101 \end{bmatrix} \begin{bmatrix} 0001101010 & 0011111011 \\ 0001101001 & 0000100011 \end{bmatrix} \right],$$

$$_VS = \left[ \begin{bmatrix} 0100010110 & 0010110101 \\ 0000110000 & 0001011011 \end{bmatrix} \begin{bmatrix} 0010011011 & 0011100000 \\ 0000101011 & 0000111101 \end{bmatrix} \right],$$

Figure 3:
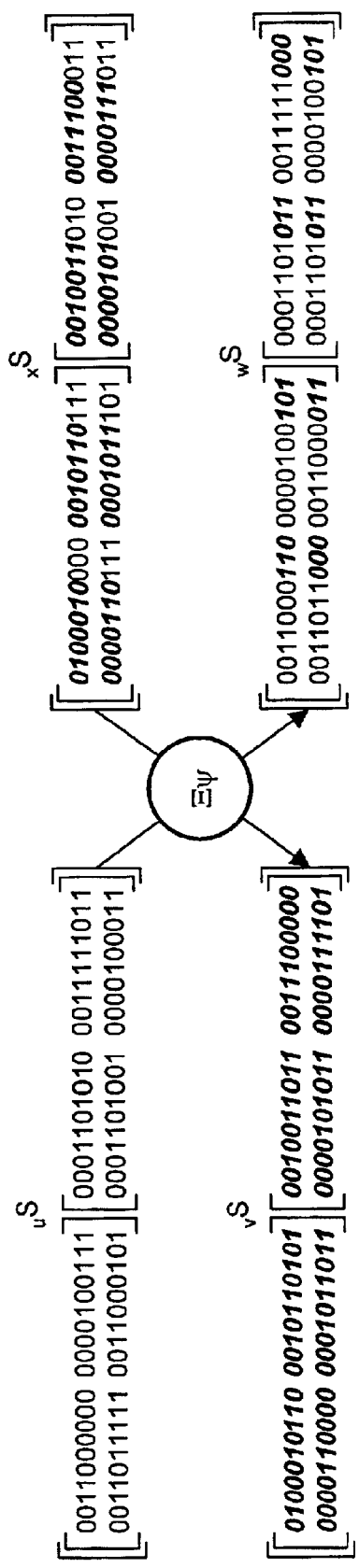
FIG. 3 is a diagram depicting an exemplary crossover operation between two fuzzy automata in accordance with the present invention.

$_UR = _VR$, and $_UE^0 = _VE^0$. In addition, the crossover allele, $\Psi$, is $$\Psi_S = \left[ \begin{bmatrix} 8 & 8 \\ 8 & 8 \end{bmatrix} \begin{bmatrix} 8 & 8 \\ 8 & 8 \end{bmatrix} \right],$$

where $\Psi_R$ and $\Psi_{E0}$ are arbitrary since $_UR = _VR$, and $_UE^0 = _VE^0$. The operation of $\Xi_{105}$ on U and V to produce W and X is illustrated in FIG. 3. The bits originating with V are shown in bold italic type; whereas those originating with U appear in regular type. As shown in FIG. 3, W receives the front portions of the bit strings from U and the back portions of the bit strings from V, while X receives the front portions of the bit strings from V and the back portions of the bit strings from U. Although the same allele location k for each element of S was used in the above example, this is not intended as a limitation on the values of S. On the contrary, different allele locations k may be suitably used in S.

Although the present invention is not limited as such, the above-described crossover operation is applied to the first generation population of fuzzy automata by randomly selecting pairs of fuzzy automata from the population and then applying the crossover operator to each pair of fuzzy automata. For a population of eight fuzzy automata, the crossover operator is applied to four randomly selected pairs of fuzzy automata. In this way, a next generation population of fuzzy automata have been derived for the given separation problem.

Lastly, each of the fuzzy automata in the next generation population is evaluated for performance 38 in view of the given separation problem. In a preferred embodiment, each fuzzy automaton is evaluated using the above-described fitness function. If one of the fuzzy automata exceeds some predefined performance threshold (e.g., a minimum diagonal dominance value), then algorithm is complete, thereby yielding a near-optimal fuzzy automaton 40 for the given separation problem. On the other hand, if none of the fuzzy automata in the next-generation population exceeded the performance threshold, then the process is repeated starting with the next-generation population serving as the input to the mutation operation. The genetic algorithm of the present invention can be repeated until at least one fuzzy automaton exceeds the performance threshold associated with the given separation problem. As will be apparent to one skilled in the art, employing a genetic algorithm having the basic elements of mutation, reproduction of the fittest, and crossover guarantees convergence upon a near-optimal solution for the given separation problem. While the above description of the present invention has been provided with reference to a particular genetic algorithm, there are other known generation-level genetic operations (e.g., blended crossover, gray coding, etc.) which may be incorporated into the overall framework of the present invention.

A signal environment, $\epsilon(\tau)$, will typically evolve over time. For an individual signal in the environment, the time variable t may be used to designate "fast time". However, the signal environment will ordinarily evolve over "slow time" $\tau$ (which may also be referred to as epoch). Accordingly, the separation problem $\Sigma(\tau)$ will also typically evolve over time.

Figure 4:
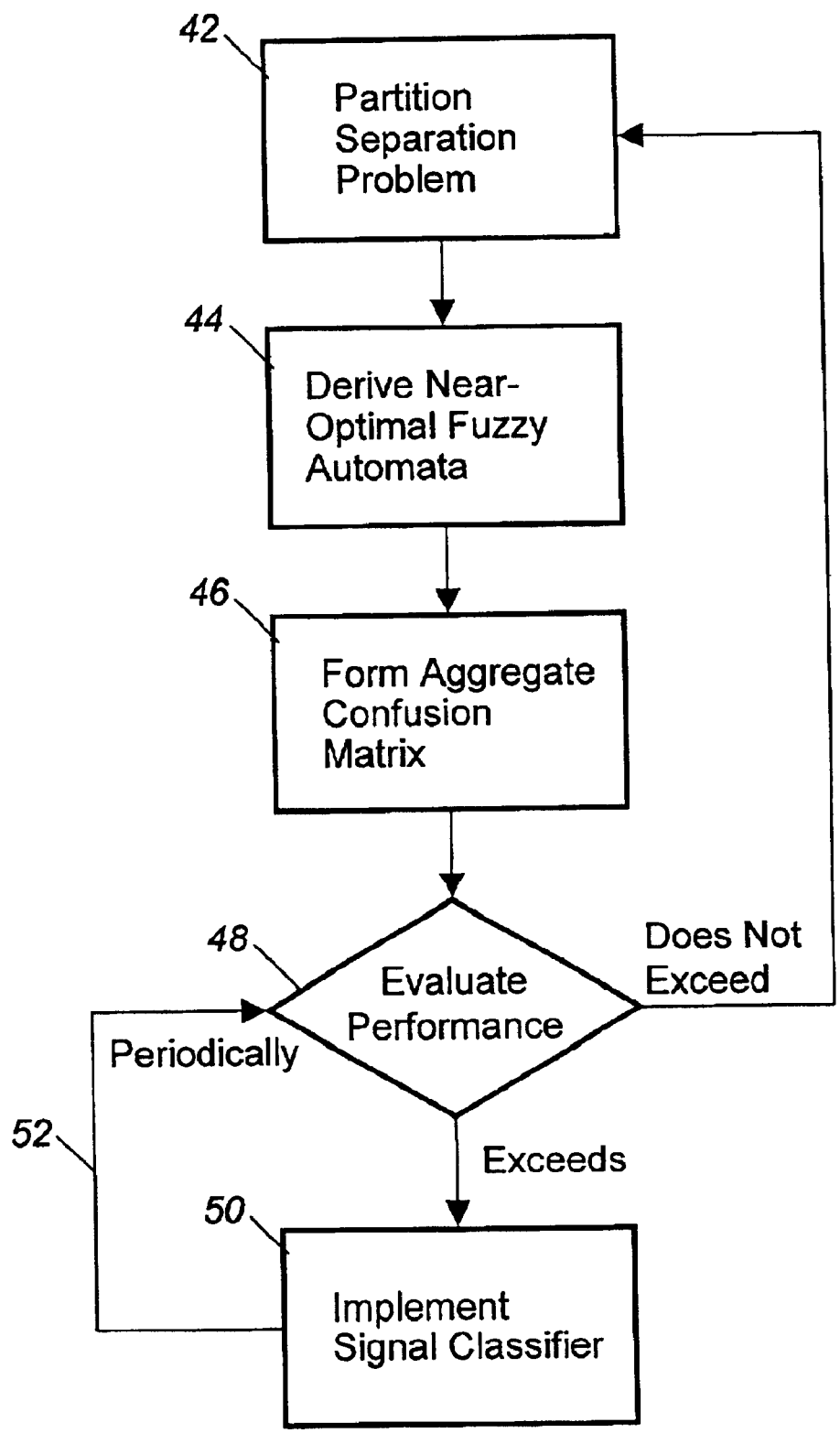
FIG. 4 is a flowchart illustrating a method for deriving a signal classifier in an evolving signal environment in accordance with the present invention.

Referring to FIG. 4, a method is provided for deriving a signal classifier in an evolving signal environment. As previously described, a single fuzzy automaton at a fixed epoch in history $\tau$ must learn to acquire a subset of signals within the environment. In addition, the fuzzy automaton must also not confuse these signals with the other signals in environment. If multiple fuzzy automata are needed to resolve the separation problem, then the separation problem $\Sigma(\tau)$ may be partitioned 42 into a set of separation problems $\{(\Sigma(\tau))_0, (\Sigma(\tau))_1, \ldots, (\Sigma(\tau))_{\gamma-1},\}$, such that $$\sum (\tau) = \bigcup_{i=0}^{\gamma-1} \left( \sum (\tau) \right)_i.$$

In accordance with the present invention, a near-optimal fuzzy automaton may be derived 44 for each individual separation problem using the above-described genetic algorithm. Thus, each of the fuzzy automata would learn to produce positive diagonal dominance for the signals representing its part of the problem $(\Sigma(\tau))_i$, as well as not to have diagonal dominance for the rest of the signal problem $\Sigma(\tau) \backslash (\Sigma(\tau))_i$.

An aggregate confusion matrix can be formed 46 from the resulting set of near-optimal fuzzy automata. The aggregate confusion matrix is used to evaluated 48 the set of fuzzy automata in view of the overall separation problem. If the set of fuzzy automata exceeds some predefined performance threshold, then the set of fuzzy automata can be used as the basis for a signal classifier. On the other hand, if the set of fuzzy automata does not exceed the performance threshold, then the separation problem is repartitioned, and the process is repeated. Likewise, the signal classifier is periodically re-evaluated over time as shown at 52 in order ensure that its performance meets some minimum performance threshold. If the signal classifier does not exceed the performance threshold, then the above-described methodology is reapplied to the separation problem. In this way, changes in the environment are learned as the epoch is advanced.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for deriving a near-optimal fuzzy automata for a given signal separation problem associated with a signal environment having a plurality of input signals, comprising:
   (a) forming a first generation population of fuzzy automata having a plurality of fuzzy automata, each of the fuzzy automata being correlated to at least one input signal found in the signal environment and operable to output an indication of the said input signal;
   (b) performing a mutation operation on each fuzzy automata in the first generation population of fuzzy automata;
   (c) reproducing the first generation population of fuzzy automata using a survival of the fittest operation; and
   (d) applying a cross-over operator to the reproduced first generation population of fuzzy automata, thereby yielding a next-generation population of fuzzy automata.

2. The method of claim 1 wherein the step of forming a first generation population further comprises the steps of providing an input set of fuzzy automata, and randomly selecting a subset of fuzzy automata from the input set of fuzzy automata.

3. The method of claim 1 wherein the step of forming a first generation population further comprises the step of defining each of the fuzzy automata in the first generation population as one or more matrices each having a plurality of data values, and representing in chromosome form each of the data vales in at least one the matrices in each of the fuzzy automata.

4. The method of claim 3 wherein the step of representing in chromosome form further comprises converting each of the data values to a binary word.

5. The method of claim 1 wherein the step of performing a mutation operation further comprises randomly flipping at least one bit in each of the fuzzy automata, where the data values for each of the fuzzy automata are represented as a binary word.

6. The method of claim 1 wherein the step of reproducing the first generation population further comprises the steps of:
   evaluating the fitness of each fuzzy automata in the first generation population of fuzzy automata;
   ranking the fuzzy automata in the first generation population of fuzzy automata according to the fitness of each fuzzy automata; and
   reproducing at least one of the fuzzy automata in accordance with a reproduction rule.

7. The method of claim 6 wherein the step of evaluating the fitness further comprises the steps of:
   identifying a set of input signals;
   evaluating each of the fuzzy automata in the first generation population of fuzzy automata based on the set of input signals, thereby yielding a confusion matrix for each fuzzy automata; and
   determining a diagonal dominance indicator for each confusion matrix.

8. The method of claim 7 wherein the step of determining a diagonal dominance indicator further comprises the step of computing the diagonal dominance indicator, D, in accordance with $$D=(C_{smallest\ on\text{-}diagonal}-C_{largest\ off\text{-}diagonal})/((C_{smallest\ on\text{-}diagonal}+C_{largest\ off\text{-}diagonal})/2).$$

9. The method of claim 6 wherein the step of ranking the fuzzy automata further comprises ranking the fuzzy automata from most fit to least fit based on the diagonal dominance indicator.

10. The method of claim 6 wherein the step of reproducing at least one of the fuzzy automata further comprises defining the reproduction rule such that the two highest ranked fuzzy automata in the first generation population of fuzzy automata are duplicated and the lowest two ranked fuzzy automata in the first generation population of fuzzy automata are eliminated.

11. The method of claim 1 wherein the step of applying a crossover operator further comprises the steps of:
   randomly identifying at least two of the fuzzy automata in the first generation population of fuzzy automata, where each of the two fuzzy automata is defined by one or more matrices each having a plurality of data values;
   representing in chromosome form each of the data values in at least one of the matrices in each of the two fuzzy automata; and
   applying a crossover operator to the at least one matrix in each of the two fuzzy automata, where the crossover operator determines the alleles of crossover between the two fuzzy automata, thereby yielding two next-generation fuzzy automata.

12. The method of claim 11 wherein the step of representing in chromosome form further comprises converting each of the data values to a binary word.

13. The method of claim 11 wherein the step of applying a crossover operator further comprises a transform matrix having the same dimensions as the at least one matrix in each of the two fuzzy automata, where the entries in the transform matrix are numbers that determine the alleles of crossover in the corresponding data values of the at least one matrix in each of the two fuzzy automata.

14. The method of claim 11 wherein the step of randomly identifying at least two of the fuzzy automata further comprises defining each of the at least two fuzzy automata as a quintuple $(U^S, U^R, U^{E0}, A^*, B^*)$, where $U^S$ is a matrix of fuzzy state transitions, $U^R$ is a matrix of fuzzy output transitions, $U^{E0}$ is a vector of fuzzy state memberships, $A^*$ is a space of input vectors, and $B^*$ is a space of output vectors.

15. The method of claim 14 wherein the step of applying a crossover operator is applicable to $U^S$, $U^R$, $U^{E0}$ of the at least two fuzzy automata.

16. The method of claim 1 further comprising the steps of:
   evaluating the performance of each fuzzy automata in the next generation of fuzzy automata in relation to the given separation problem; and
   repeating steps (b) thru (d) until at least one fuzzy automata from the next-generation of fuzzy automata achieves a satisfactory performance level in relation to the given separation problem.

17. The method of claim 16 wherein the step of repeating steps (b) thru (d) further comprises using the next-generation population of fuzzy automata as input to the mutation operation.

18. A method for generating a next generation of fuzzy automata for a signal separation problem associated with a signal environment having a plurality of input signals, comprising:
   providing a first and a second input fuzzy automata, where each fuzzy automata is correlated to at least one input signal found in the signal environment and is defined by one or more matrices each having a plurality of data values, such that each fuzzy automata outputs an indication of said input signal;

representing in chromosome form at least one of the matrices in each of the first and second input fuzzy automata; and applying a crossover operator to the at least one matrix in each of the first and second input fuzzy automata, where the crossover operator determines the alleles of crossover between the first and second input fuzzy automata, thereby yielding two next-generation fuzzy automata.

19. The method of claim 18 wherein the step of representing in chromosome form further comprises converting each of the data values to a binary word.

20. The method of claim 18 wherein the step of applying a crossover operator further comprises a transform matrix having the same dimensions as the at least one matrix in each of the two fuzzy automata, where the entries in the transform matrix are numbers that determine the alleles of crossover in the corresponding data values of the at least one matrix in each of the two fuzzy automata.

21. The method of claim 18 wherein the step of providing a first and a second input fuzzy automata further comprises defining each of the first and second input fuzzy automata as a quintuple ($U^S$, $U^R$, $U^{EO}$, $A^*$, $B^*$), where $U^S$ is a matrix of fuzzy state transitions, $U^R$ is a matrix of fuzzy output transitions, $U^{EO}$ is a vector of fuzzy state memberships, $A^*$ is a space of input vectors, and $B^*$ is a space of output vectors, such that the crossover operator is applicable to $U^S$, $U^R$, $U^{EO}$ of the first and second input fuzzy automata.

22. A method for evaluating the performance of a fuzzy automata for a signal separation problem associated with a signal environment, comprising:

identifying a set of input signals found in the signal environment;

evaluating the set of input signals using the fuzzy automata, thereby yielding a confusion matrix for the fuzzy automata; and determining a diagonal dominance indicator for the confusion matrix.

23. The method of claim 22 wherein the step of determining a diagonal dominance indicator further comprises the step of computing the diagonal dominance indicator, D, in accordance with $$D = (C_{smallest\ on\text{-}diagonal} - C_{largest\ off\text{-}diagonal}) / ((C_{smallest\ on\text{-}diagonal} + C_{largest\ off\text{-}diagonal})/2).$$

\* \* \* \* \*

UNITED STATES PATENT AND TRADEMARK OFFICE
CERTIFICATE OF CORRECTION

PATENT NO.     : 6,839,698 B2
DATED          : January 4, 2005
INVENTOR(S)    : Duong Nguyen, Scott A. Imhoff and Susan R. Kent It is certified that error appears in the above-identified patent and that said Letters Patent is hereby corrected as shown below:

Column 9,
Line 29, after "data" change "vales" to -- values --

Signed and Sealed this

Twenty-fourth Day of May, 2005

JON W. DUDAS
*Director of the United States Patent and Trademark Office*